United States Patent
Miller et al.

(10) Patent No.: US 8,545,106 B2
(45) Date of Patent: Oct. 1, 2013

(54) SYSTEM AND METHOD FOR ISOLATING A ROLLING-ELEMENT BEARING

(75) Inventors: Craig R. Miller, West Bloomfield, MI (US); Robert S. Thompson, Jr., White Lake, MI (US)

(73) Assignee: Williams International Co., L.L.C., Walled Lake, MI (US)

( * ) Notice: Subject to any disclaimer, the term of this patent is extended or adjusted under 35 U.S.C. 154(b) by 596 days.

(21) Appl. No.: 12/832,702

(22) Filed: Jul. 8, 2010

(65) Prior Publication Data

US 2011/0007991 A1    Jan. 13, 2011

Related U.S. Application Data (60) Provisional application No. 61/223,821, filed on Jul. 8, 2009.

(51) Int. Cl.
*F16C 33/66* (2006.01)

(52) U.S. Cl.
USPC .......................................... 384/474; 384/473

(58) Field of Classification Search
USPC ................. 384/462, 466, 471, 473, 517, 556, 384/563, 99, 474, 475, 428, 495, 500, 558, 384/505, 506
See application file for complete search history.

(56) References Cited

U.S. PATENT DOCUMENTS

| | | | |
|---|---|---|---|
| 4,023,868 A * | 5/1977 | Miki | 384/563 |
| 4,033,645 A * | 7/1977 | Yamada | 384/563 |
| 4,440,456 A | 4/1984 | Klusman | |
| 4,775,248 A | 10/1988 | Barbic et al. | |
| 4,872,767 A | 10/1989 | Knapp | |
| 4,992,024 A | 2/1991 | Heydrich | |
| 5,048,978 A * | 9/1991 | Singh | 384/99 |
| 5,076,766 A | 12/1991 | Gutknecht | |
| 5,201,585 A | 4/1993 | Gans et al. | |
| 5,205,384 A | 4/1993 | Heshmat | |
| 5,207,511 A * | 5/1993 | Bobo | 384/99 |
| RE34,276 E | 6/1993 | Glaser et al. | |
| 5,228,786 A | 7/1993 | Tanimoto et al. | |
| 5,261,751 A * | 11/1993 | Heinz | 384/466 |
| 5,380,100 A | 1/1995 | Yu | |
| 5,967,762 A | 10/1999 | Keller et al. | |
| 6,196,721 B1 | 3/2001 | Farkaly | |
| 6,220,829 B1 | 4/2001 | Thompson et al. | |
| 6,695,478 B2 * | 2/2004 | Bos et al. | 384/99 |
| 7,121,729 B2 | 10/2006 | Davis et al. | |
| 2010/0180592 A1 | 7/2010 | Williams et al. | |

FOREIGN PATENT DOCUMENTS

| | | |
|---|---|---|
| JP | 2000035036 A | 2/2000 |
| JP | 2001289245 A | 10/2001 |

* cited by examiner

*Primary Examiner* — Thomas Diaz
(74) *Attorney, Agent, or Firm* — Raggio & Dinnin, P.C.

(57) ABSTRACT

Lubrication fluid is discharged through an axial gap between a outer bearing race and a bearing housing from a cavity bounded in part by a forward surface of the outer bearing race that is axially slideable within the bearing housing so as to provide for changing the axial gap. The pressure in the cavity is automatically controlled responsive to an axial force on outer bearing race by an axial position of the outer bearing race that determines a size of the axial gap, so as to provide for increasing the pressure responsive to increasing axial force over at least a portion of an operating range. The lubrication fluid in the axial gap provides for isolating axial vibrations of the outer bearing race relative to the bearing housing.

27 Claims, 6 Drawing Sheets

SYSTEM AND METHOD FOR ISOLATING A ROLLING-ELEMENT BEARING

CROSS-REFERENCE TO RELATED APPLICATIONS

The instant application claims the benefit of prior U.S. Provisional Application Ser. No. 61/223,821 filed on 8 Jul. 2009, which is incorporated herein by reference.

DESCRIPTION OF EMBODIMENT(S)

Figure 1:
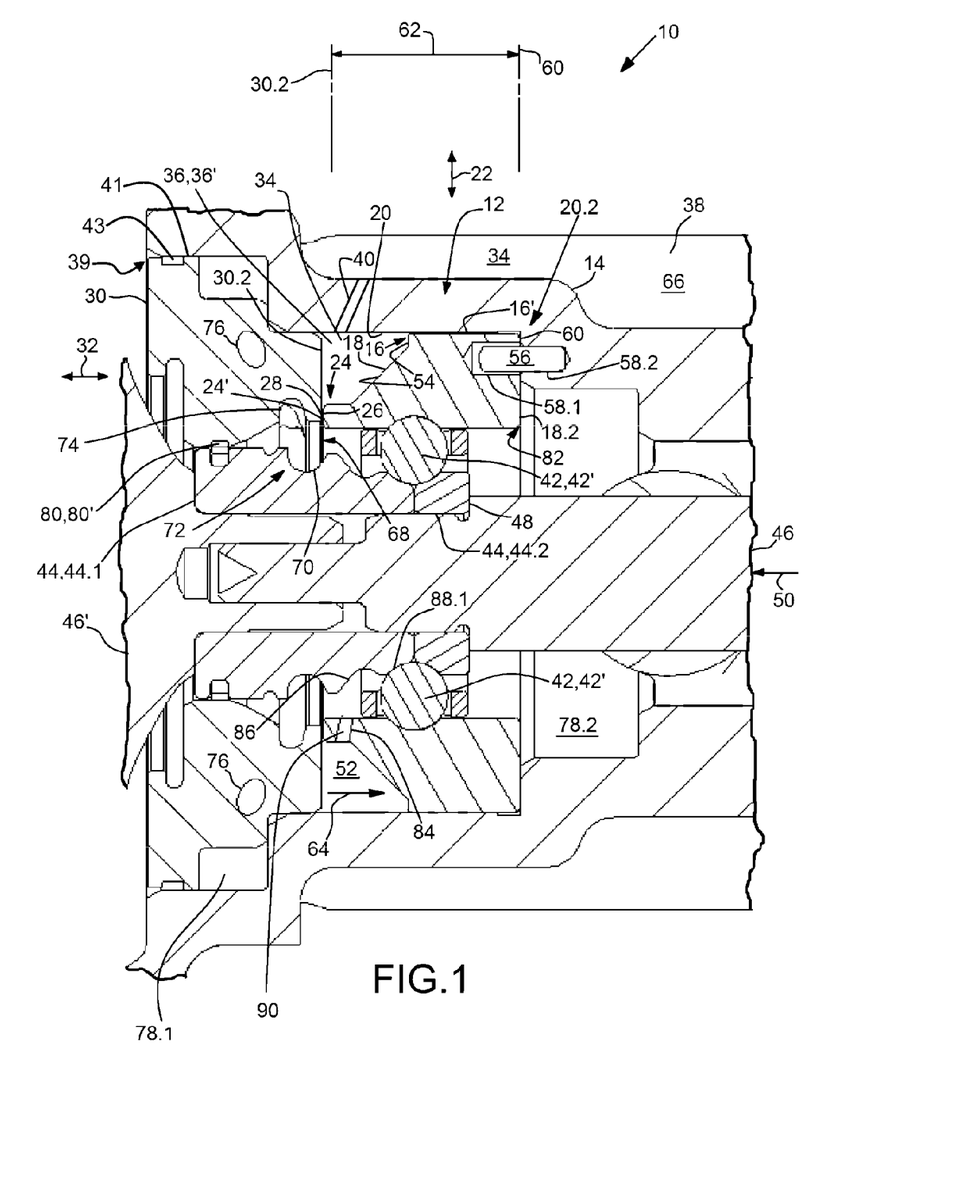
FIG. 1 illustrates a cross-sectional view of a system for isolating a rolling-element bearing.

Referring to FIG. 1, a rolling-element bearing system 10 incorporates a rolling-element bearing 12 within a bearing housing 14, wherein a circumferential oil squeeze film damper annulus 16 is disposed radially between an outer race 18 of the rolling-element bearing 12 and an inner bore 20 of the bearing housing 14, so as to provide for a radial component of isolation and damping by squeeze film damping of the rolling-element bearing 12 in a radial direction 22; and a flat oil-filled isolation annulus 24 is axially disposed between a forward annular surface 26 of the outer race 18 of the rolling-element bearing 12 and an adjacent aft surface portion 28—i.e. a first annular boundary—of an associated bearing retainer 30 adjacent thereto, so as to provide for isolation of the rolling-element bearing 12 in an axial direction 32. The oil squeeze film damper annulus 16 and the oil-filled isolation annulus 24 are each supplied with oil 34 from a cavity 36, for example, a hydrostatic annulus 36', between the outer race 18 and the bearing retainer 30 and within the inner bore 20, forward of the oil squeeze film damper annulus 16 and radially surrounding the oil-filled isolation annulus 24, wherein the hydrostatic annulus 36' is supplied with oil 34 from an oil supply galley 38 through one or more feed orifices 40 (first port) that provide for fluid communication therebetween and for metering the oil 34 supplied to the hydrostatic annulus 36' from the oil supply galley 38. The bearing retainer 30 is located forward of the outer race 18, an outer surface 39 of the bearing retainer 30 is sealed to a second bore 41 of the bearing housing 14, for example, by cooperation with an associated sealing groove 43 on the outer surface 39 of the bearing retainer 30, and the aft surface portion 28 of the bearing retainer 30 defines the first annular boundary.

The rolling-element bearing 12 comprises a plurality of rolling elements 42. For example, FIG. 1 illustrates a ball bearing 12' comprising a plurality of bearing balls 42'. The rolling-element bearing 12 further comprises a split inner race 44 comprising forward 44.1 and aft 44.2 portions, wherein the split inner race 44 engages a shaft 46 and hub 46' that are rotationally supported by the rolling-element bearing system 10, with the aft portion 44.2 of the split inner race 44 abutting a shoulder 48 on the shaft 46 so as to provide for transferring a forward-directed axial thrust load 50 from the shaft 46 to the rolling elements 42 of the rolling-element bearing 12, which then in turn transfer that forward-directed axial thrust load 50 to the outer race 18 of the rolling-element bearing 12, whereupon the forward-directed axial thrust load 50 is reacted by a pressure 52 of the oil 34 in the hydrostatic annulus 36' and within the oil-filled isolation annulus 24 acting together against a projected forward surface area 54 of the outer race 18 of the rolling-element bearing 12, wherein, referring also to FIG. 2, the projected forward surface area 54 is provided for by a combination of the forward annular surface 26 of the outer race 18 of the rolling-element bearing 12, and a transitional surface 18.1 between the forward annular surface 26 and an outer surface 18.3 of the outer race 18.

The outside diameter of the outer race 18 of the rolling-element bearing 12 is smaller than the inside diameter of the inner bore 20 of the bearing housing 14—for example, in one embodiment, about 0.004, centimeters (cm) per cm of diameter, or less, smaller, or substantially greater than the expected operational displacement of the rolling-element bearing system 10, —which provides for a sufficient thickness of the associated oil squeeze film 16' of the oil squeeze film damper annulus 16 so that the rolling-element bearing 12 is suspended on the associated oil squeeze film 16' within the inner bore 20, wherein the outer race 18 is free to slide axially within the inner bore 20, but is restrained from rotation within the inner bore 20 by an anti-rotation pin 56 in engagement with corresponding axial holes 58.1, 58.2 in an aft surface 18.2 of the outer race 18 and an inner shoulder 60—i.e. a second annular boundary—at the aft end 20.2 of the inner bore 20 of the bearing housing 14, respectively. In one embodiment, the nominal axial clearance between the outer race 18 and the fixed distance 62 between the aft surface 30.2 of the bearing retainer 30 and the inner shoulder 60 at the aft end 20.2 of the inner bore 20 is about two thirds of the associated radial clearance. The axial position of the outer race 18 within the inner bore 20 is responsive to an equilibrium of the opposing forward-directed axial thrust load 50 from the shaft 46 and the aft-directed axial force 64 from the pressure 52 of the oil 34 in the hydrostatic annulus 36' and within the oil-filled isolation annulus 24 acting together against the projected forward surface area 54 of the outer race 18 of the rolling-element bearing 12.

The projected forward surface area 54 of the outer race 18 abutting the hydrostatic annulus 36' is sized in combination with the nominal supply pressure 66 in the oil supply galley 38 so that a resulting maximum possible aft-directed axial force 64 from the pressure 52 of the oil 34 in the hydrostatic annulus 36' exceeds the expected nominal maximum forward-directed axial thrust load 50 from the shaft 46. Accordingly, with the forward annular surface 26 of the outer race 18 of the rolling-element bearing 12 abutting the aft surface 28 of the bearing retainer 30, under nominal conditions the aft-directed axial force 64 from the pressure 52 in the hydrostatic annulus 36' will exceed the forward-directed axial thrust load 50 from the shaft 46, thereby moving the outer race 18 aftward, thereby opening a gap 68 defining the oil-filled isolation annulus 24 between the forward annular surface 26 of the outer race 18 and the aft surface 28 of the bearing retainer 30 into and through which oil 34 from the hydrostatic annulus 36' flows. Oil 34 flowing into the oil-filled isolation annulus 24 forms an associated oil isolation film 24' therein which provides for accommodating relative motion of the outer race 18 and the bearing retainer 30 thereacross. Oil 34 flowing therethrough is sprayed radially inwards towards an aft surface 70 of an external oil scavenge annulus 72 on the forward portion 44.1 of the split inner race 44, and is then deflected forwards and outwards thereby into an internal oil scavenge annulus 74 on the inside of an aft portion of the bearing retainer 30. Oil 34 collected thereby is discharged through one or more drain holes 76 in the bearing retainer 30, into a first sump 78.1, and eventually returned to an oil pump supplying oil 34 to the oil supply galley 38. A forward portion 44.1 of the split inner race 44 incorporates a seal 80, for example, a piston ring seal 80', that provides for sealing the forward portion 44.1 of the split inner race 44 to the bearing retainer 30 so as prevent leakage of oil 34 through the interface therebetween.

Oil 34 from the oil squeeze film 16' in the oil squeeze film damper annulus 16 supplied by the hydrostatic annulus 36' is discharged along a gap 82 between the aft surface 18.2 of the outer race 18 and the inner shoulder 60 at the aft end 20.2 of the inner bore 20, and then into a second sump 78.2 and eventually returned to the oil pump supplying oil 34 to the oil supply galley 38.

Oil 34 from the hydrostatic annulus 36' is also supplied through one or more bearing lubrication orifices 84 radially inwards through a forward portion of the outer race 18 of the rolling-element bearing 12 so as to provide for spraying oil 34 therefrom either directly on the rolling elements 42 of the rolling-element bearing 12, or indirectly thereupon after deflection from an external bearing lubrication annulus 86 on the forward portion 44.1 of the split inner race 44 between the bearing raceway portion 88.1 thereof and the external oil scavenge annulus 72.

The oil squeeze film 16' and the oil isolation film 24' together provide for isolating the bearing housing 14 from the shaft 46, wherein the term "isolating" is intended to mean that under nominal conditions that the associated elements being isolated from one another are separated from one another by an oil film that prevents direct contact of the elements with one another, so as to prevent Coulomb friction therebetween, and so as to reduce the level of forces that could otherwise be transmitted from one element to the other. Accordingly, if the displacement amplitude of a vibration of one element relative to the other in a direction across the gap separating the two is less than the thickness of the oil film separating the elements, then the elements will not contact one another, but instead, the vibration will be accommodated within and by displacement of the associated oil film. Similarly, the associated oil film will act to prevent vibrations of one element relative to the other in a direction parallel to the gap separating the two, that would otherwise result from coupling to one another by Coulomb friction.

Figure 2:
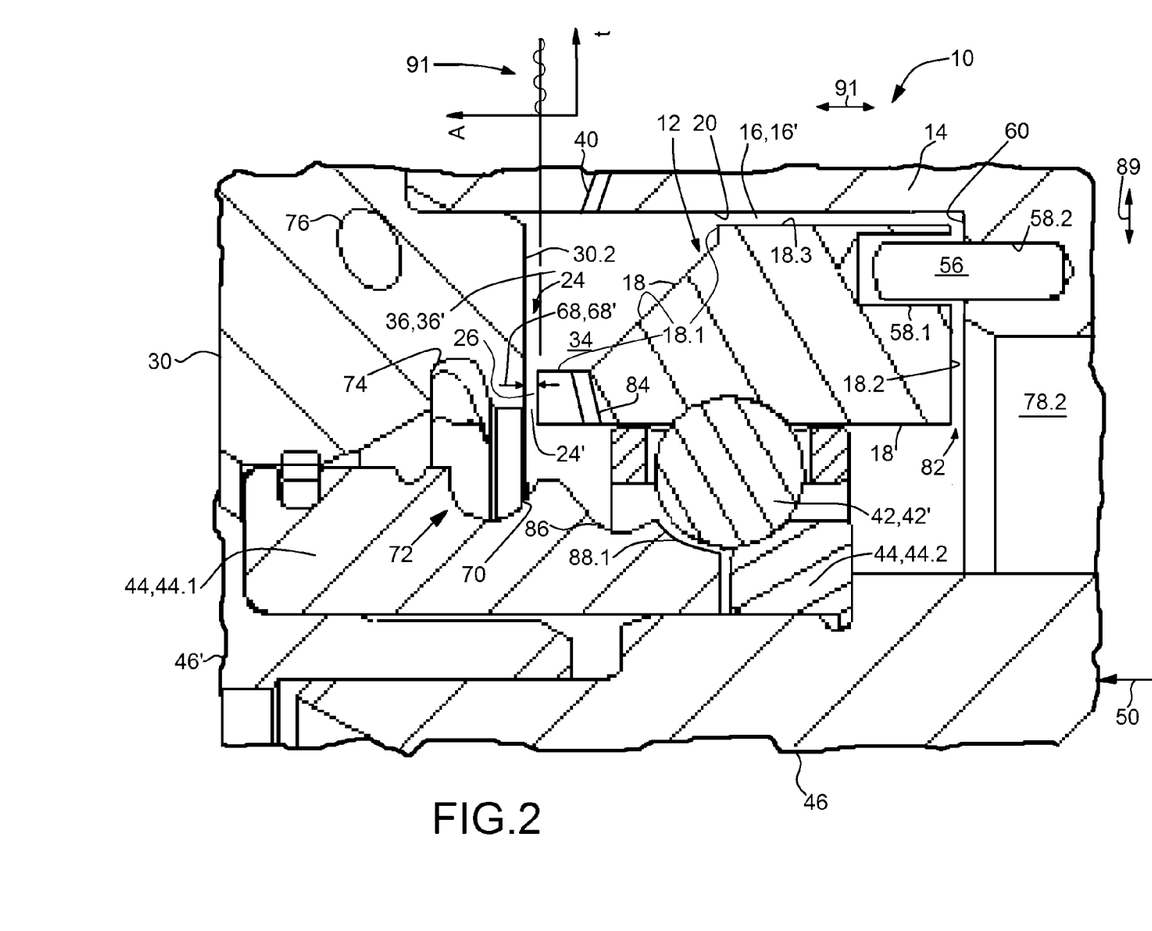
FIG. 2 illustrates an expanded fragmentary cross-sectional view of a portion of the system illustrated in FIG. 1.

Referring to FIG. 2, the oil squeeze film 16' provides for isolating the outer race 18 from the bearing housing 14 in respect of both radial 89 and axial 91 vibrations. Similarly, the oil isolation film 24' provides for isolating the outer race 18 from the bearing retainer 30 in respect of both radial 89 and axial 91 vibrations. For example, if the peak-to-peak value of the displacement amplitude A of axial vibration 91 of the outer race 18 is less than the thickness 68' of the oil isolation film 24', then the forward annular surface 26 of the outer race 18 will remain isolated from the aft surface portion 28 of the bearing retainer 30, and the oil squeeze film 16' will prevent contact and resulting transmission of vibration by Coulomb friction between the outer surface 18.3 of the outer race 18 of the rolling-element bearing 12 and the inner bore 20 of the bearing housing 14. For example, FIG. 2 illustrates a plot of displacement amplitude A as a function of time t, for example, as might result from either runout of either the shaft 46 or rolling-element bearing 12. Similarly, the oil 34 in the gap 82 between the aft surface 18.2 of the outer race 18 and the inner shoulder 60 at the aft end 20.2 of the inner bore 20 provides for isolation of the aft surface 18.2 of the outer race 18 of the rolling-element bearing 12 from the inner shoulder 60 at the aft end 20.2 of the inner bore 20 of the bearing housing 14.

Figure 3A:
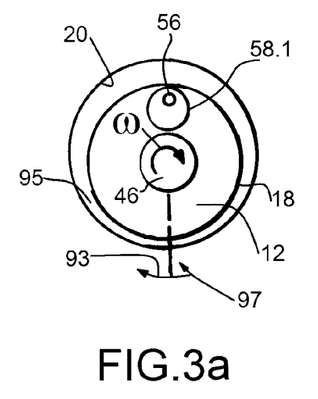
FIGS. 3a-3d schematically illustrate various states of nutation of the rolling-element bearing within an inner bore of a bearing housing, and an associated squeeze film damping process, for the system illustrated in FIG. 1.
Figure 3B:
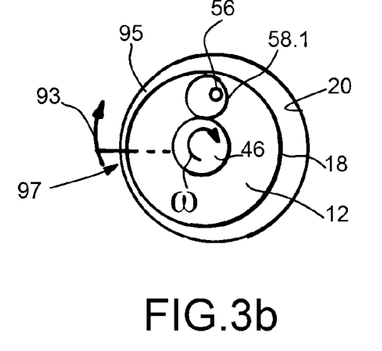
Figure 3C:
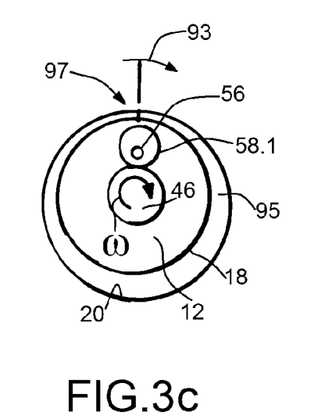
Figure 3D:
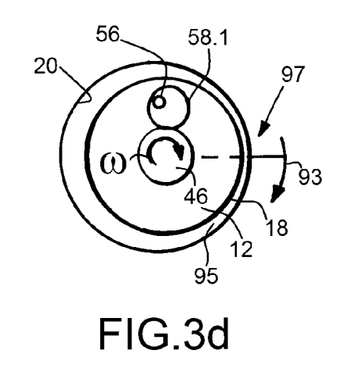

The oil squeeze film 16' also provides for squeeze film damping of rotationally-induced vibrations, for example, as might result from an imbalance of the shaft 46 or any elements rotationally coupled thereto. Referring to FIGS. 3a-3d, in which the rolling-element bearing 12 is illustrated schematically and the proportions of the associated elements are exaggerated to illustrate the principle of operation, an imbalance of the shaft 46 rotating with an angular velocity ω and rotationally supported by the rolling-element bearing 12 causes the rolling-element bearing 12 and the associated outer race 18 thereof to nutate 93 within the inner bore 20 of the bearing housing 14 and to squeeze the oil 34 within the oil squeeze film damper annulus 16, which generates a pressure wave 95 ahead of the region 97 of minimum oil film thickness, wherein the pressure within the pressure wave 95 substantially exceeds the pressure 52 in the hydrostatic annulus 36' and provides for damping the associated vibrations. The outer race 18 is restrained from rotating within the inner bore 20 by the action of the anti-rotation pin 56 in engagement with the axial hole 58.1 in the aft surface 18.2 of the outer race 18, wherein the inside diameter of the axial hole 58.1 is sufficiently larger than the outside diameter of the associated anti-rotation pin 56 so that under worst case conditions the anti-rotation pin 56 will not contact the axial hole 58.1 at either of the extreme radial positions encountered during nutation, for example, as illustrated in FIGS. 3a and 3c. Accordingly, the axial hole 58.1 in the aft surface 18.2 is configured so as to substantially prevent a radial coupling of vibration from the axial hole 58.1 to the anti-rotation pin 56. However, the anti-rotation pin 56 would act against one of the sides of the axial hole 58.1 in order to rotationally restrain the outer race 18 within the inner bore 20, although under normal operating conditions, the clearance space within the axial hole 58.1 would be filled with oil 34 that would mitigate against hard contacts therewithin.

Accordingly, in accordance with the isolation and damping collectively provided by the oil squeeze film 16' and the oil isolation film 24', vibrations or vibrational forces from the shaft 46 are either not substantially transmitted to the bearing housing 14, or if transmitted, the associated magnitudes of any transmitted vibrations or vibrational forces are substantially attenuated upon transmission from the shaft 46 to the bearing housing 14, wherein load bearing portions of the outer race 18 of the rolling-element bearing 12 are not in direct mechanical contact with the bearing housing 14, but instead are separated therefrom by the oil squeeze film 16' and the oil isolation film 24'. For example, vibrations or vibrational forces in or from the shaft can be caused by imbalance thereof, an imbalance of associated elements connected thereto that rotate therewith, or by gyroscopic precession or orbiting thereof. Vibration of the bearing housing 14 can otherwise cause noise, and otherwise undamped transmission of vibration from the shaft 46 to the bearing housing 14 can lead to premature failure of associated components. Accordingly, the isolation of the shaft 46 by the rolling-element bearing system 10 can provide for reduced noise from the bearing housing 14, and reduced vibrational forces on the associated components providing for increased reliability, relative to a rolling-element bearing system without such isolation.

The size and geometry of the hydrostatic annulus 36', the oil squeeze film damper annulus 16 and the oil-filled isolation annulus 24, the one or more feed orifices 40, and the one or more bearing lubrication orifices 84 are configured so that, over a range of operation of the rolling-element bearing system 10, the oil squeeze film 16' and the oil isolation film 24' are continuously supplied with oil 34 from the hydrostatic annulus 36', thereby providing associated oil-filled clearances between the outer race 18 of the rolling-element bearing 12 and both the bearing housing 14 and the bearing retainer 30, so that the outer race 18 of the rolling-element bearing 12 is not in direct physical contact with either the bearing housing 14 or the bearing retainer 30 so as to be isolated therefrom by the associated oil squeeze film 16' and the oil isolation film 24' that provide for accommodating or damping vibratory motion therebetween and that provide for minimizing or eliminating Coulomb friction therebetween that might otherwise lead to cross-coupling forces and a resulting destabilization of the dynamics of the rotating shaft 46 and elements in rotation therewith.

The pressure 52 in the hydrostatic annulus 36' is responsive to the nominal supply pressure 66, the pressure drop across the one or more feed orifices 40, the flow of oil 34 through the oil squeeze film damper annulus 16, the flow of oil 34 through the oil-filled isolation annulus 24, and the flow of oil 34 through the one or more bearing lubrication orifices 84. The flow of oil 34 through the oil-filled isolation annulus 24 is dependent upon the gap 68 between the forward annular surface 26 of the outer race 18 and the aft surface 28 of the bearing retainer 30, which is responsive to a magnitude of the forward-directed axial thrust load 50 from the shaft 46 on the aft portion 44.2 of the split inner race 44, wherein size of the gap 68, and therefore the flow of oil 34 therethrough, decreases with increasing forward-directed axial thrust load 50. Accordingly, the pressure 52 in the hydrostatic annulus 36' is automatically and passively regulated by the axial position of the outer race 18 within the inner bore 20 of the bearing housing 14 so that the resulting aft-directed axial force 64 from the pressure 52 of the oil 34 in the hydrostatic annulus 36' seeks an equilibrium with the opposing forward-directed axial thrust load 50 from the shaft 46, with the pressure 52 of the oil 34 in the hydrostatic annulus 36' increasing with increasing forward-directed axial thrust load 50, and with the distance of the gap 68 between the forward annular surface 26 of the outer race 18 and the aft surface 28 of the bearing retainer 30, and the resulting thickness 68' of the oil isolation film 24', decreasing with increasing forward-directed axial thrust load 50.

Figure 4:
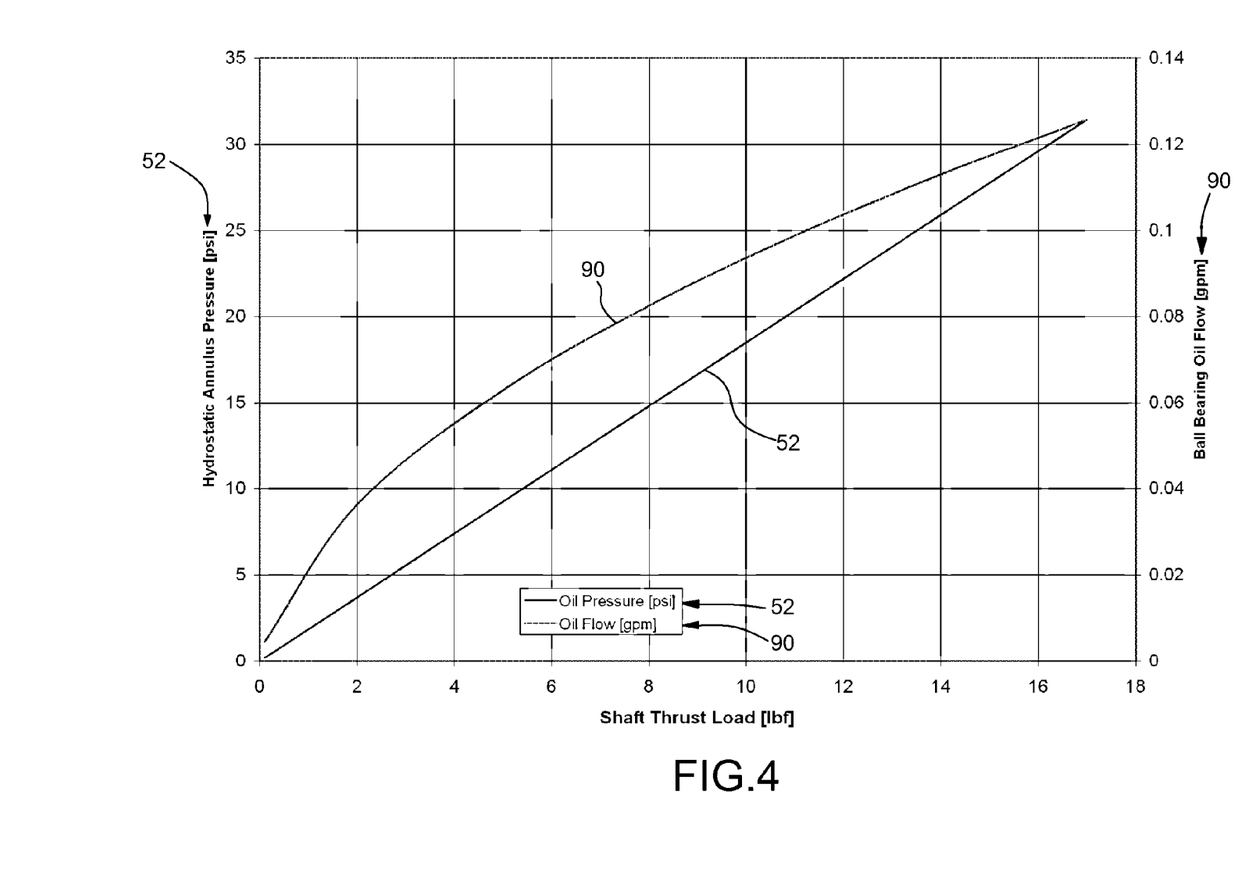
FIG. 4 illustrates a plot of oil pressure in an associated hydrostatic annulus supplying oil to the rolling-element bearing, as a function of axial thrust load on the bearing.

Accordingly, in accordance with a first aspect of the rolling-element bearing system 10, the pressure 52 in the hydrostatic annulus 36' increases with decreasing flow of oil 34 therefrom, so that with increasing forward-directed axial thrust load 50 the flow of oil 34 through the one or more bearing lubrication orifices 84 increases, whereby the amount of oil 34 lubricating the rolling elements 42 of the rolling-element bearing 12 increases with increasing forward-directed axial thrust load 50. For example, referring to FIG. 4, for one particular example, the pressure 52 of oil 34 in the hydrostatic annulus 36' increases linearly with increasing forward-directed axial thrust load 50, and the resulting flow rate 90 of oil 34 through the one or more bearing lubrication orifices 84 increases non-linearly with increasing forward-directed axial thrust load 50, wherein the rate of increase of flow rate 90 decreases with increasing pressure 52. The increased flow rate 90 of oil 34 with increasing forward-directed axial thrust load 50 provides for maintaining an associated oil film thickness between the rolling elements 42 and the outer 18 and split inner 44 races of the rolling-element bearing 12 so as to prevent or limit Coulomb friction therebetween.

Figure 5:
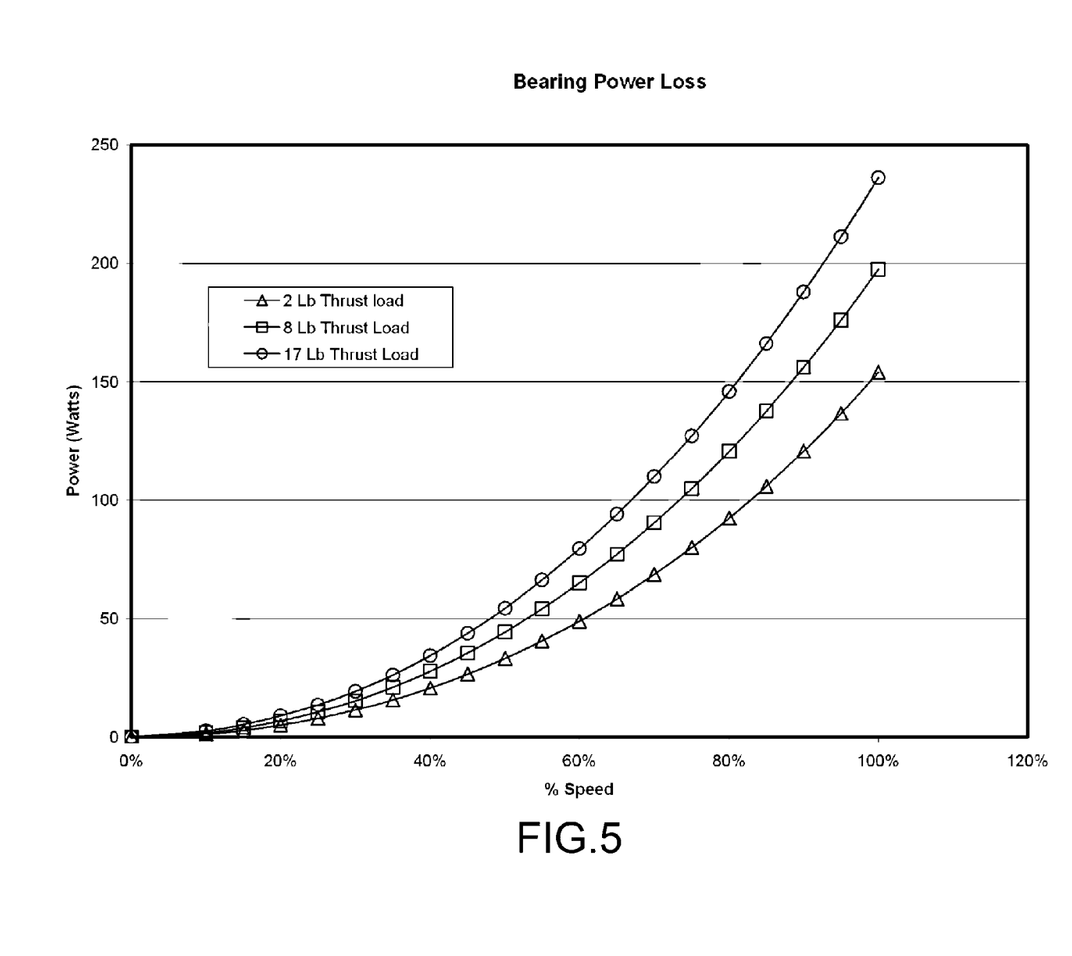
FIG. 5 illustrates a plot of bearing power loss as a function of bearing-supported shaft speed for various axial thrust loads on the bearing.

The size and geometry of the hydrostatic annulus 36', the oil squeeze film damper annulus 16 and the oil-filled isolation annulus 24, the one or more feed orifices 40, and the one or more bearing lubrication orifices 84 is also configured so that, over a range of operation of the rolling-element bearing system 10, the flow rate 90 of oil 34 through the one or more bearing lubrication orifices 84 is sufficient to properly lubricate the rolling elements 42 of the rolling-element bearing 12, but not excessive so as either to cause skidding of the rolling elements 42—that can substantially diminish the life of the rolling-element bearing 12—or to cause excessive pumping work by the rolling-element bearing 12 that can lead to skidding. For example, in accordance with one method, a proper flow rate 90 of oil 34 can be determined from a heat balance of the rolling-element bearing 12 and the associated oil 34 providing for the lubrication thereof. Referring to FIG. 5, the inherent thrust-responsive regulation of the flow rate 90 of oil 34 through the one or more bearing lubrication orifices 84 provides for reducing power loss in the rolling-element bearing 12 as the forward-directed axial thrust load 50 is reduced. Generally, this power loss increases with increasing speed, and with increasing forward-directed axial thrust load 50, the latter because of the increased amount flow rate 90 of oil 34 necessary to prevent or limit Coulomb friction between the rolling elements 42 and the outer 18 and split inner 44 races of the rolling-element bearing 12 as forward-directed axial thrust load 50 is increased. A reduction in bearing power loss where possible provides for relatively higher shaft accelerations than would otherwise be possible. For example, in the application of a turbocharger, the rolling-element bearing system 10 provides for reducing associated turbocharger spool-up time, also known as "turbo lag", relative to a rolling-element bearing system for which the associated oil pressure was relatively constant and for which the associated oil flow was independent of axial thrust load, yet sufficiently high so as to accommodate expected axial thrust loads.

Figure 6:
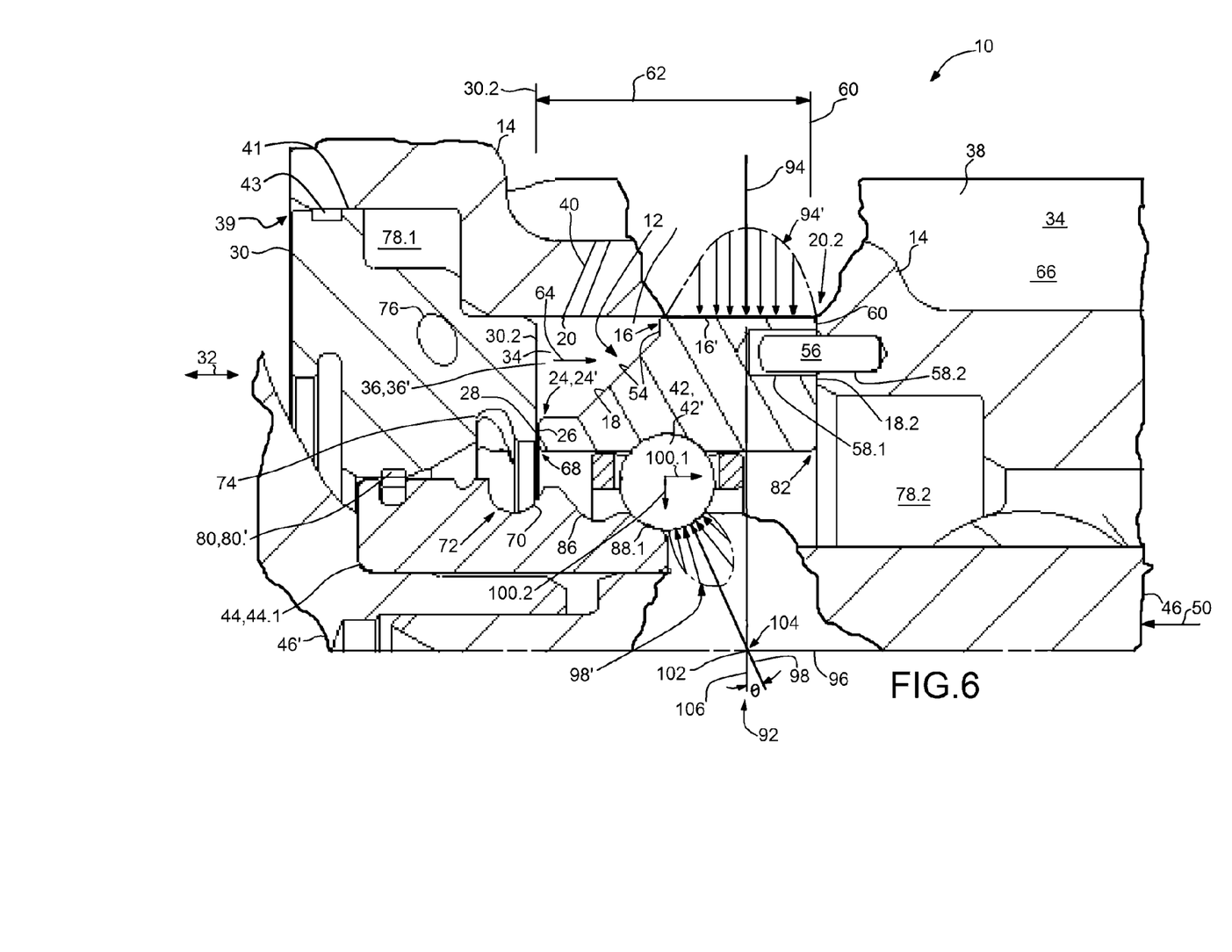
FIG. 6 illustrates a fragmentary cross-sectional view of the system illustrated in FIG. 1 for isolating a rolling-element bearing, further illustrating several associated pressure distributions acting on the rolling-element bearing.

Referring to FIG. 6, in accordance with a second aspect of the rolling-element bearing system 10, the projected axial location 92 of the center of pressure 94 of an associated pressure distribution 94' the oil squeeze film 16' acting in a radial direction on the outside of the outer race 18, projected onto the axis of rotation 96 of the shaft 46, is substantially aligned with the center of pressure 98 of the associated pressure distribution 98' of the aft portion 44.2 of the split inner race 44 acting on each rolling element 42 of the rolling-element bearing 12 at the projection of the center of pressure 98 on the axis of rotation 96 of the shaft 46, so that the axial 100.1 and radial 100.2 forces acting on the each rolling element 42 of the rolling-element bearing 12 have little or negligible moment relative to the center of pressure 94 of the oil squeeze film 16', so as to provide for minimizing or mitigating vibrations that would otherwise result from bearing misalignment and shaft moments that can generate high vibrations at many different frequencies, including 2E. Stated in another way the radially-acting oil squeeze film 16' is located so that a reaction force 102 acting at a contact angle θ from the aft portion 44.2 of the split inner race 44 on each rolling element 42 of the rolling-element bearing 12 is substantially aligned with a point of intersection 104 of the axis of rotation 96 of the shaft 46 with a plane 106 containing the center of pressure 94 of the radial-acting oil squeeze film 16', for at least one operating condition. As a result, the radial forces 100.2, for example, resulting from the weight of the shaft 46 and rotating elements coupled thereto, or from dynamic forces, for example, associated with imbalance or gyroscopic effects, are supported by the rolling-element bearing 12 and transmitted to the outer race 18 thereof as a substantially pure radial load without an associated moment, and without generating additional associated vibratory modes. Accordingly, by reducing associated secondary forces, this provides for improved kinematics and lifespan of the rolling-element bearing 12 than otherwise possible.

In accordance with a third aspect of the rolling-element bearing system 10, oil 34 discharged from the oil isolation film 24' sprayed radially inwards towards the aft surface 70 of an external oil scavenge annulus 72 on the forward portion 44.1 of the split inner race 44 is deflected forwards and outwards into an internal oil scavenge annulus 74 on the inside of an aft portion of the bearing retainer 30, away from the rolling elements 42 of the rolling-element bearing 12, so that the associated lubrication process of the rolling-element bearing system 10 is not substantially affected by the oil isolation film 24' other than the above-described self-regulating influence of the gap 68 associated with the oil-filled isolation annulus 24 on the pressure 52 of the oil 34 in the hydrostatic annulus 36'. Similarly, oil 34 discharged from the oil squeeze film 16' is radially discharged aftward of the rolling-element bearing 12 and also does not interact with the rolling elements 42 of the rolling-element bearing 12. Accordingly, oil 34 from the oil squeeze film 16' and the oil isolation film 24' discharged away from the rolling elements 42 of the rolling-element bearing 12 does not contribute to associated bearing power loss, so that the associated lubrication and squeeze film damping processes can be configured independently of each other.

Generally, the rolling-element bearing 12 can be of any type capable of reacting both radial and axial components of force, wherein the associated outer race 18 and split inner race 44 are adapted to cooperate with the particular style of rolling elements 42. For example, in another embodiment, the rolling-element bearing 12 could comprise a tapered roller bearing with the associated rolling elements 42 comprising tapered rollers that cooperate with corresponding conical surfaces of the associated outer 18 and split inner 44 races.

The inner race of the rolling-element bearing 12 need not necessarily be split, but alternatively could comprise a single contiguous element comprising either a complete bearing raceway portion 88.1 capable of supporting either forward- or aft-directed thrust, or a half bearing raceway portion 88.1 capable of supporting only forward-directed thrust.

Furthermore, it should be understood that the anti-rotation pin 56 and associated axial holes 58.1, 58.2 need not necessarily be circular in cross-section. For example, alternatively, the anti-rotation pin 56 could comprise a tab, and could alternatively be a part of or attached to one of the aft surface 18.2 of the outer race 18 or the inner shoulder 60 at the aft end 20.2 of the inner bore 20 of the bearing housing 14, without requiring a corresponding axial hole 58.1, 58.2.

Yet further, it should be understood that the outer surface 18.3 of the outer race 18, and the corresponding inner bore 20 of the bearing housing 14, need not necessarily be cylindrical in shape, but could alternatively have some other shape, for example, with either an ellipsoidal or undulating profile, which would provide for both associated squeeze-film damping and preventing rotation of the outer race 18 relative to the inner bore 20 of the bearing housing 14.

The rolling-element bearing system 10 provides for combined radial and axial vibration isolation that provides for both extending the life of the associated rolling-element bearing 12 and reducing associated noise during operation thereof, relative to a rolling-element bearing system without isolation and squeeze film damping. The rolling-element bearing system 10 provides for isolation of a rolling-element bearing 12 comparable to, or better than, a corresponding sleeve bearing, but with substantially less friction, which provides for relatively reduced power loss, and relatively higher possible angular accelerations of the shaft 46 and associated rotational elements supported thereby, for otherwise comparable operating conditions. The rolling-element bearing system 10 can be used in a variety of applications, including, but not limited to, turbochargers; compressors; turbines; and engines, including internal combustion engines and gas turbine engines.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein the expression "A or B" is true if either A or B is true, or if both A and B are true. Accordingly, the particular arrangements disclosed are meant to be illustrative only and not limiting as to the scope of the invention, which is to be given the full breadth of any claims that are supported by the above description and drawings, and any and all equivalents thereof.

The invention claimed is:

1. A rolling-element bearing system, comprising:
  a. an outer bearing race, wherein said outer bearing race comprises:
    i. an outer surface;
    ii. a forward annular surface located radially inward of said outer surface; and
    iii. a transitional surface between said forward annular surface and said outer surface;
  b. a bore of a bearing housing, wherein said outer bearing race is located within said bore and is axially slideable therewithin;
  c. a first annular boundary within said bore, wherein said first annular boundary is located forward of said forward annular surface of said outer bearing race; and
  d. a first port through said bore, wherein said first port provides for admitting a lubrication fluid under pressure into a cavity within said bore, said cavity is bounded by at least a portion of said first annular boundary, a portion of said bore, and said transitional surface of said outer bearing race; and when said lubrication fluid is admitted to said cavity under pressure, an axial position of said outer bearing race within said bore provides for automatically controlling a pressure of said lubrication fluid within said cavity responsive to an axial force on said outer bearing race by adjusting a first axial gap between said forward annular surface of said outer bearing race and said first annular boundary within said bore through which said lubrication fluid is discharged, wherein a radially-inward portion of said first axial gap is open so as to provide for said lubrication fluid to discharge therefrom.

2. A rolling-element bearing system as recited in claim 1, further comprising an axial isolation annulus established by said first axial gap and bounded by said forward annular surface of said outer bearing race and by said first annular boundary within said bore, wherein said axial isolation annulus provides for substantially isolating forward annular surface of said outer bearing race from direct mechanical contact with said first annular boundary within said bore during axial vibration of said outer bearing race.

3. A rolling-element bearing system, comprising:
   a. an outer bearing race, wherein said outer bearing race comprises:
      i. an outer surface;
      ii. a forward annular surface located radially inward of said outer surface; and
      iii. a transitional surface between said forward annular surface and said outer surface;
   b. a bore of a bearing housing, wherein said outer bearing race is located within said bore and is axially slideable therewithin;
   c. a first annular boundary within said bore, wherein said first annular boundary is located forward of said forward annular surface of said outer bearing race; and
   d. a first port through said bore, wherein said first port provides for admitting a lubrication fluid under pressure into a cavity within said bore, said cavity is bounded by at least a portion of said first annular boundary, a portion of said bore, and said transitional surface of said outer bearing race; and when said lubrication fluid is admitted to said cavity under pressure, an axial position of said outer bearing race within said bore provides for automatically controlling a pressure of said lubrication fluid within said cavity responsive to an axial force on said outer bearing race by adjusting a first axial gap between said forward annular surface of said outer bearing race and said first annular boundary within said bore through which said lubrication fluid is discharged, wherein a radial gap between said outer surface of said outer bearing race and said bore of said bearing housing is in fluid communication with said cavity and defines a radial squeeze-film damper annulus when filled with said lubrication fluid from said cavity, so as to provide for radial isolation of vibrations of said outer bearing race relative to said bearing housing.

4. A rolling-element bearing system as recited in claim 3, further comprising an axial isolation annulus established by said first axial gap and bounded by said forward annular surface of said outer bearing race and by said first annular boundary within said bore, wherein said axial isolation annulus provides for substantially isolating forward annular surface of said outer bearing race from direct mechanical contact with said first annular boundary within said bore during axial vibration of said outer bearing race.

5. A rolling-element bearing system as recited in claim 4, wherein said cavity comprises an annulus in fluid communication both with said radial squeeze-film damper annulus and with said axial isolation annulus so as to provide for supplying said lubrication fluid therefrom to both said radial squeeze-film damper annulus and said axial isolation annulus.

6. A rolling-element bearing system, comprising:
   a. an outer bearing race, wherein said outer bearing race comprises:
      i. an outer surface;
      ii. a forward annular surface located radially inward of said outer surface; and
      iii. a transitional surface between said forward annular surface and said outer surface;
   b. a bore of a bearing housing, wherein said outer bearing race is located within said bore and is axially slideable therewithin;
   c. a first annular boundary within said bore, wherein said first annular boundary is located forward of said forward annular surface of said outer bearing race; and
   d. a first port through said bore, wherein said first port provides for admitting a lubrication fluid under pressure into a cavity within said bore, said cavity is bounded by at least a portion of said first annular boundary, a portion of said bore, and said transitional surface of said outer bearing race; and when said lubrication fluid is admitted to said cavity under pressure, an axial position of said outer bearing race within said bore provides for automatically controlling a pressure of said lubrication fluid within said cavity responsive to an axial force on said outer bearing race by adjusting a first axial gap between said forward annular surface of said outer bearing race and said first annular boundary within said bore through which said lubrication fluid is discharged, wherein said outer bearing race further comprises an aft annular surface on an aft end of said outer bearing race, further comprising a second annular boundary within said bore, wherein said second annular boundary is located aft of said aft annular surface of said outer bearing race and is separated from said second annular boundary by a second axial gap, and said second axial gap is in fluid communication with said cavity via said radial gap between said outer surface of said outer bearing race and said bore of said bearing housing.

7. A rolling-element bearing system as recited in claim 6, wherein said outer bearing race further comprises a first axial hole in said aft annular surface, wherein said first axial hole is located radially between said outer surface and an inner surface of said outer bearing race, further comprising:
   a. a second axial hole in said second annular boundary, wherein said second axial hole in said second annular boundary is substantially aligned with said first axial hole in said aft annular surface of said outer bearing race;
   b. a pin extending between and within said first and second axial holes, wherein a diameter of one of said first or second axial holes is greater than a diameter of said pin so that over a range of radial motion of said outer bearing race within said bore of said bearing housing, said pin remains radially separated by a gap from at least one of said first or second axial holes.

8. A rolling-element bearing system, comprising:
   a. an outer bearing race, wherein said outer bearing race comprises:
      i. an outer surface;
      ii. a forward annular surface located radially inward of said outer surface; and
      iii. a transitional surface between said forward annular surface and said outer surface;
   b. a bore of a bearing housing, wherein said outer bearing race is located within said bore and is axially slideable therewithin;
   c. a first annular boundary within said bore, wherein said first annular boundary is located forward of said forward annular surface of said outer bearing race; and
   d. a first port through said bore, wherein said first port provides for admitting a lubrication fluid under pressure into a cavity within said bore, said cavity is bounded by at least a portion of said first annular boundary, a portion of said bore, and said transitional surface of said outer bearing race; and when said lubrication fluid is admitted to said cavity under pressure, an axial position of said outer bearing race within said bore provides for automatically controlling a pressure of said lubrication fluid within said cavity responsive to an axial force on said outer bearing race by adjusting a first axial gap between said forward annular surface of said outer bearing race and said first annular boundary within said bore through which said lubrication fluid is discharged, wherein said outer bearing race further comprises at least one radially-inwardly-directed orifice that provides for discharging said lubrication fluid from said cavity for lubrication of at least one rolling element of said rolling-element bearing system.

9. A rolling-element bearing system, comprising:
a. an outer bearing race, wherein said outer bearing race comprises:
   i. an outer surface;
   ii. a forward annular surface located radially inward of said outer surface; and
   iii. a transitional surface between said forward annular surface and said outer surface;
b. a first bore of a bearing housing, wherein said outer bearing race is located within said first bore and is axially slideable therewithin;
c. a first annular boundary within said first bore, wherein said first annular boundary is located forward of said forward annular surface of said outer bearing race;
d. a first port through said first bore, wherein said first port provides for admitting a lubrication fluid under pressure into a cavity within said first bore, said cavity is bounded by at least a portion of said first annular boundary, a portion of said first bore, and said transitional surface of said outer bearing race; and when said lubrication fluid is admitted to said cavity under pressure, an axial position of said outer bearing race within said first bore provides for automatically controlling a pressure of said lubrication fluid within said cavity responsive to an axial force on said outer bearing race by adjusting a first axial gap between said forward annular surface of said outer bearing race and said first annular boundary within said first bore through which said lubrication fluid is discharged; and
e. a bearing retainer within said bearing housing, wherein said bearing retainer is located forward of said outer bearing race, an outer surface of said bearing retainer is sealed to a second bore of said bearing housing, and an aft annular surface of said bearing retainer defines said first annular boundary.

10. A rolling-element bearing system as recited in claim 9, further comprising:
a. separate forward and aft portions of a split inner bearing race;
b. a forward outer rolling-surface portion located on an aft portion of said forward portion of said split inner bearing race;
c. an aft outer rolling-surface portion located on a forward portion of said aft portion of said split inner bearing race; and
d. a plurality of rolling elements located between an inner rolling-surface portion of said outer bearing race and said forward and aft outer rolling-surface portions of said forward and aft portions of said split inner bearing race, wherein said axial force acts on said outer bearing race through said plurality of rolling elements from said aft portion of said split inner bearing race, and a junction between an outer surface of said forward portion of said split inner bearing race and an inner cylindrical surface of said bearing retainer incorporates a rotary seal.

11. A rolling-element bearing system as recited in claim 9, wherein a portion of said lubrication fluid is discharged through an oil squeeze film damper annulus between an outer surface of said outer bearing race and said first bore of said bearing housing.

12. A rolling-element bearing system, comprising:
a. an outer bearing race, wherein said outer bearing race comprises:
   i. an outer surface;
   ii. a forward annular surface located radially inward of said outer surface; and
   iii. a transitional surface between said forward annular surface and said outer surface;
b. a bore of a bearing housing, wherein said outer bearing race is located within said bore and is axially slideable therewithin;
c. a first annular boundary within said bore, wherein said first annular boundary is located forward of said forward annular surface of said outer bearing race;
d. a first port through said bore, wherein said first port provides for admitting a lubrication fluid under pressure into a cavity within said bore, said cavity is bounded by at least a portion of said first annular boundary, a portion of said bore, and said transitional surface of said outer bearing race; and when said lubrication fluid is admitted to said cavity under pressure, an axial position of said outer bearing race within said bore provides for automatically controlling a pressure of said lubrication fluid within said cavity responsive to an axial force on said outer bearing race by adjusting a first axial gap between said forward annular surface of said outer bearing race and said first annular boundary within said bore through which said lubrication fluid is discharged;
e. separate forward and aft portions of a split inner bearing race;
f. a forward outer rolling-surface portion located on an aft portion of said forward portion of said split inner bearing race;
g. an aft outer rolling-surface portion located on a forward portion of said aft portion of said split inner bearing race; and
h. a plurality of rolling elements located between an inner rolling-surface portion of said outer bearing race and said forward and aft outer rolling-surface portions of said forward and aft portions of said split inner bearing race, wherein said axial force acts on said outer bearing race through said plurality of rolling elements from said aft portion of said split inner bearing race.

13. A rolling-element bearing system as recited in claim 12, wherein said forward and aft portions of said split inner bearing race each incorporate respective bores, further comprising a shaft extending through said bore of said aft portion of said split inner bearing race, wherein said shaft incorporates a shoulder that abuts at least a portion of an aft annular surface of said aft portion of said split inner bearing race and provides for transferring said axial force to said aft portion of said split inner bearing race, and said axial force is forward-directed.

14. A rolling-element bearing system as recited in claim 13, further comprising a hub operatively coupled to a forward end of said shaft, wherein said hub incorporates a shoulder that abuts at least a portion of a forward annular surface of said forward portion of said split inner bearing race, and an aft portion of said hub extends within said bore of said forward portion of said split inner bearing race.

15. A rolling-element bearing system as recited in claim 12, wherein a portion of an outer surface of said forward portion of said split inner bearing race is axially aligned with said first axial gap and is sloped so as to provide for deflecting said lubrication fluid discharged radially inwards from said first axial gap forwards away from said plurality of rolling elements for subsequent collection and discharge from said rolling-element bearing system.

16. A rolling-element bearing system as recited in claim 12, wherein a radial gap between said outer surface of said outer bearing race and said bore of said bearing housing is in fluid communication with said cavity and defines a radial squeeze-film damper annulus when filled with said lubrication fluid from said cavity, so as to provide for radial isolation of vibrations of said outer bearing race relative to said bearing housing, said axial force is an axial component of an effective reaction force vector acting between a rolling element of said plurality of rolling elements and said aft portion of said split inner bearing race, and a center of pressure of said radial squeeze-film damper annulus is substantially axially-aligned with a point of intersection defined by the intersection of said effective reaction force vector with a central axis of rotation of said rolling-element bearing system.

17. A method of operating a rolling-element bearing system, comprising:
   a. supplying a lubrication fluid to a cavity within a bearing housing, wherein said cavity is bounded in part by a forward surface of an outer bearing race of the rolling-element bearing system;
   b. discharging said lubricating fluid from said cavity to at least one surface of said rolling-element bearing system, wherein at least a portion of said lubrication fluid is discharged through a first axial gap between an axially-distal portion of said outer bearing race and a proximally adjacent relatively fixed surface of said bearing housing, and said outer bearing race is axially slideable within a bore in said bearing housing so as to provide for changing said first axial gap; and
   c. automatically controlling a pressure of said lubrication fluid in said cavity responsive to an axial force on said rolling-element bearing system, by a resulting axial position of said outer bearing race of said rolling-element bearing system that determines a size of said first axial gap, so as to provide for increasing said pressure responsive to increasing axial force over at least a portion of an operating range of said rolling-element bearing system.

18. A method of operating a rolling-element bearing system as recited in claim 17, further comprising discharging a portion of said lubrication fluid from said cavity to a radial gap between an outer surface of said outer bearing race and said bore in said bearing housing so as to provide for radial squeeze-film damping of vibrations of said outer bearing race relative to said bearing housing.

19. A method of operating a rolling-element bearing system as recited in claim 18, further comprising generating a pressure of said lubrication fluid in said radial gap so that a center of pressure acting on said outer surface of said outer bearing race is substantially axially-aligned with a point of intersection defined by the intersection of an effective reaction force vector with a central axis of rotation of said rolling-element bearing system, wherein said effective reaction force vector acts between a rolling element of said rolling-element bearing system and a corresponding aft portion of an inner bearing race, and said axial force is an axial component of said effective reaction force vector.

20. A method of operating a rolling-element bearing system as recited in claim 17, wherein the operation of discharging said lubrication fluid through said first axial gap provides for isolation of axial vibrations of said outer bearing race relative to said proximally adjacent relatively fixed surface of said bearing housing.

21. A method of operating a rolling-element bearing system as recited in claim 17, further comprising discharging a portion of said lubrication fluid from said cavity through at least one radially-inwardly-directed orifice so as to provide for lubricating at least one rolling element of said rolling-element bearing system.

22. A method of operating a rolling-element bearing system as recited in claim 17, further comprising:
   a. applying said axial force from a shaft to an aft portion of an inner bearing race;
   b. transferring said axial force to said outer bearing race through a plurality of rolling elements of said rolling-element bearing system; and
   c. reacting said axial force with a pressure of said lubrication fluid in said cavity acting on said forward surface of said outer bearing race while maintaining said first axial gap filled with said lubrication fluid between said axially-distal portion of said outer bearing race and said proximally adjacent relatively fixed surface of said bearing housing so as to prevent a hard contact between said outer bearing race and said proximally adjacent relatively fixed surface of said bearing housing.

23. A method of operating a rolling-element bearing system as recited in claim 17, further comprising:
   a. discharging said lubrication fluid radially inwards from said first axial gap;
   b. deflecting said lubrication fluid discharged from said first axial gap away from a plurality of rolling elements of said rolling-element bearing system; and
   c. collecting and discharging from said bearing housing said lubrication fluid deflected away from said plurality of rolling elements.

24. A method of operating a rolling-element bearing system as recited in claim 17, further comprising restraining rotation of said outer bearing race relative to said bore in said bearing housing with a pin acting between said bearing housing and said outer bearing race through a gap containing said lubrication fluid, wherein a size of said gap substantially exceeds an amplitude of radial vibrations of said outer bearing race relative to said bearing housing.

25. A method of operating a rolling-element bearing system as recited in claim 17, wherein said rolling-element bearing system incorporates a split inner bearing race with forward and aft portions split relative to a center of a rolling element engaged therewith.

26. A method of operating a rolling-element bearing system as recited in claim 25, further comprising:
   a. abutting said aft portion of said split inner bearing race with a shoulder of a shaft,
   b. abutting said forward portion of said split inner bearing race with a shoulder of a hub; and
   c. limiting relative movement of said forward and aft portions of said split inner bearing race by attaching said hub to said shaft within said split inner bearing race.

27. A method of operating a rolling-element bearing system as recited in claim 25, wherein a forward surface of said cavity is bounded by an aft surface of a bearing retainer, further comprising sealing said forward portion of said split inner bearing race to said bearing retainer while providing for relative rotation therebetween.

* * * * *